Aug. 27, 1929.  E. P. SEGHERS  1,726,127
TRAP
Filed March 28, 1924  3 Sheets-Sheet 1
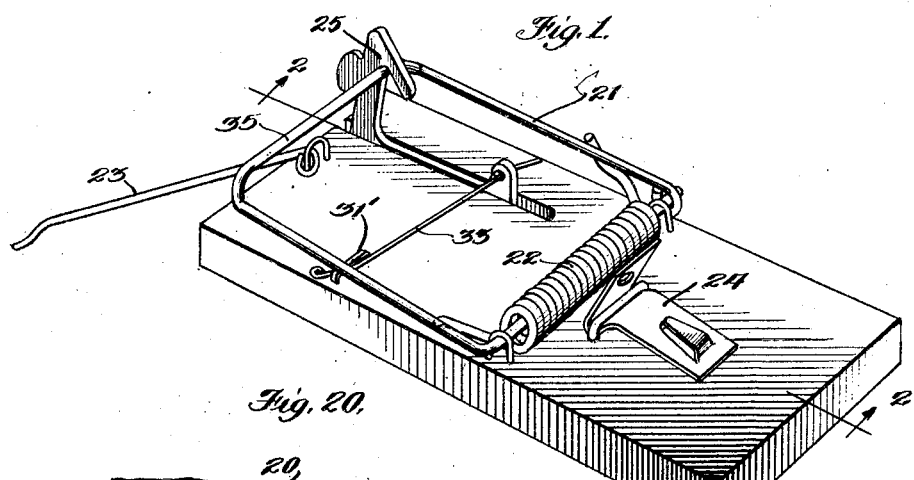
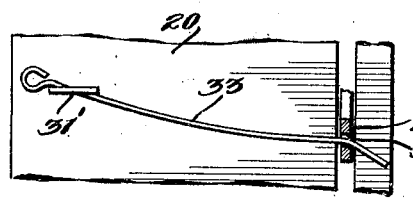
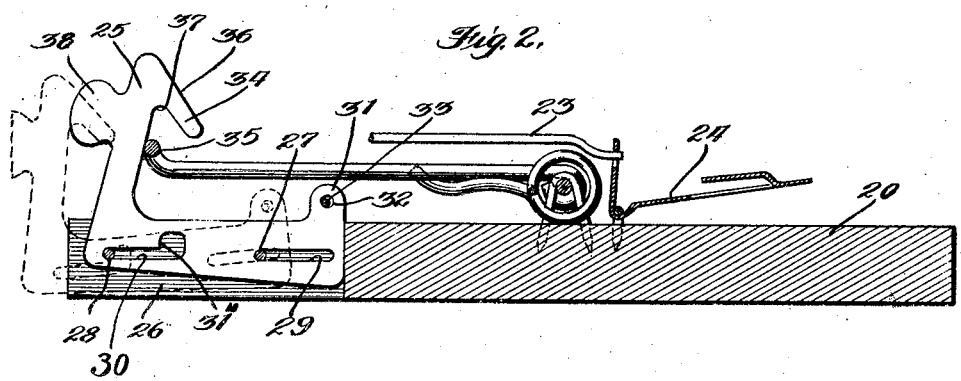
Inventor
Emiel P. Seghers
By Nissen & Crane
attys.

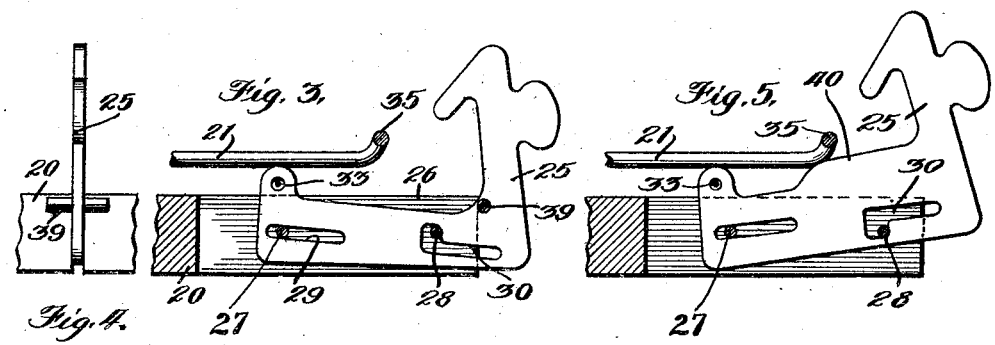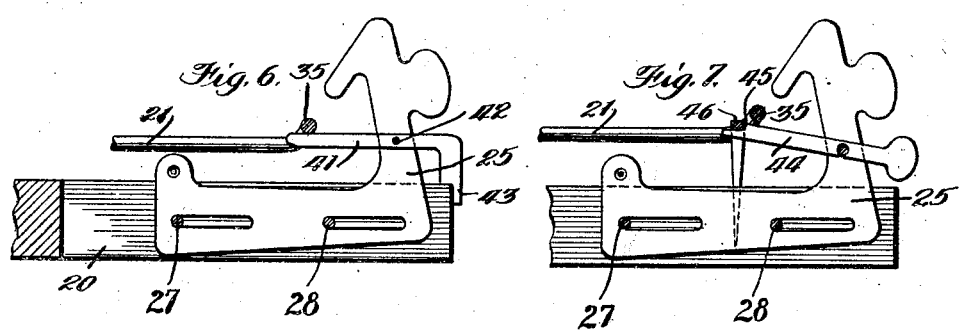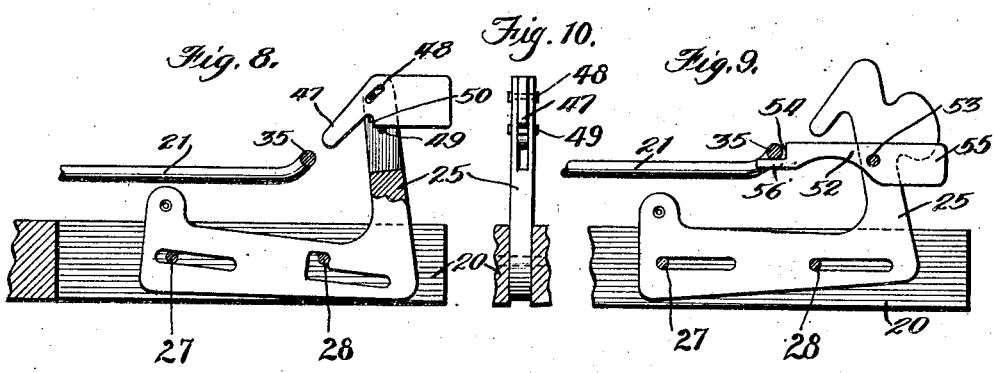

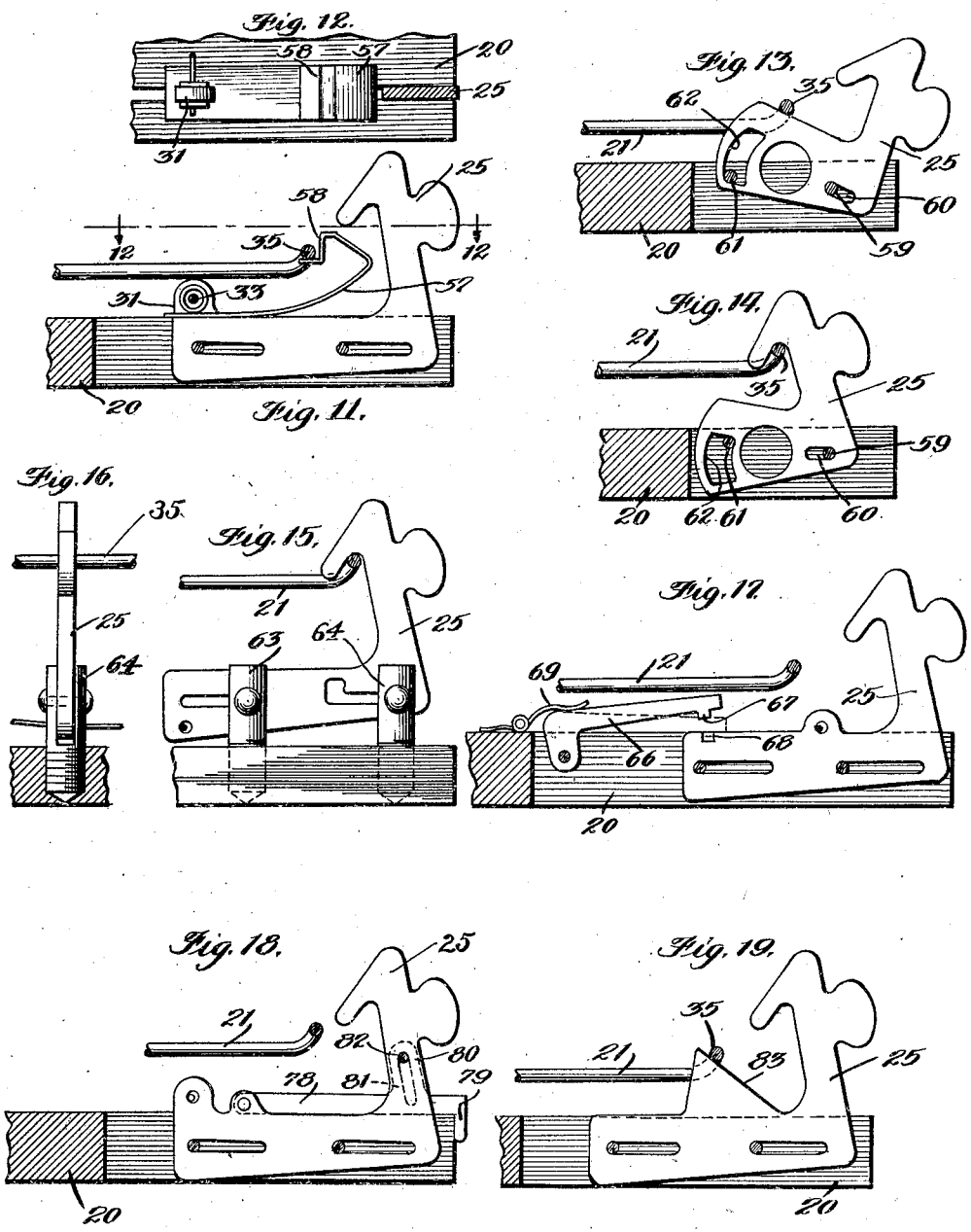

Patented Aug. 27, 1929.

1,726,127

UNITED STATES PATENT OFFICE.

EMIEL P. SEGHERS, OF CHICAGO, ILLINOIS.

TRAP.

Application filed March 28, 1924. Serial No. 702,479.

This invention relates to animal traps having a jaw or fall provided with a trigger for holding it in set position, and has for its object the provision of safety means to facilitate setting the trap without danger.

The invention is exemplified in the combination and arrangement of parts shown in the accompanying drawings and described in the following specification, and it is more particularly pointed out in the appended claims.

In the drawings,—

Fig. 1 is a perspective view of a trap embodying one form of the present invention.

Fig. 2 is a section substantially on line 2—2 of Fig. 1.

Fig. 3 is a fragmentary section showing a modified form of the invention.

Fig. 4 is an elevation looking from the right in Fig. 3.

Figs. 5, 6, 7, 8, 9, 11, 13, 14, 15, 17, 18 and 19 are all views similar to Fig. 3, but showing modified forms of the invention.

Fig. 10 is an end elevation of the device shown in Fig. 8.

Fig. 12 is a horizontal section on line 12—12 of Fig. 11.

Fig. 16 is an end view of the device shown in Fig. 15.

Fig. 20 is a fragmentary view showing a detail of construction.

Referring first to Figs. 1 and 2, the numeral 20 designates the base or supporting block for a spring trap of well known construction, having a jaw or fall 21 and a spring 22 for actuating the jaw. A detent 23 is provided for holding the jaw in open or set position, the trigger 24 being provided for cooperation with the end of the detent 23 in the manner shown in Fig. 2. A safety catch 25 is mounted to slide in a slot 26 formed in the base 20. The catch 25 is held in place by pins 27 and 28, which pass through slots 29 and 30 respectively in the catch 25. The slot 30 is provided with a shoulder portion 31″ arranged to engage the pin 28 when the detent is drawn to its retracted position shown in broken lines in Fig. 2. The pins 27 and 28 may be wire nails driven into the base 20 from the outer edge thereof. It is found best to drill holes for the pins 27 and 28 prior to driving them into position so that they will be accurately directed and so that there is no danger of splitting the base member. The safety catch 25 may be punched from sheet metal, the thickness being approximately $\frac{1}{16}$ to $\frac{3}{32}$ of an inch. The upwardly projecting lug 31 is provided with an opening 32 for receiving the spring 33. The spring 33 is held in position on the top face of the block 20 by a staple 31′ driven into the top of the block. It will be seen that the spring 33 urges the safety catch 25 into its operative position. The upper portion of the catch 25 is provided with a hook 34 which overlies the cross bar 35 of the fall 21 when the trap is being set. During the opening movement of the jaw 21 the bar 35 strikes the upper beveled face 36 of the safety catch and pushes the safety catch backwardly against the tension of the spring 33 until the bar 35 passes the lower end of the hook 34. The safety catch then snaps forward so as to prevent closing of the jaw while the trap is being set. The retaining notch 37 is elevated to a position above that occupied by the bar 35 when the trap is set so that the bar 35 is free to exert its spring force upon the detent 23 and thus hold the detent and trigger in set position without interference on the part of the safety catch. Should the trigger be accidentally sprung or the jaw released in any way during the setting operation it will be intercepted by the hook 34 so as to prevent injury to the operator. It will be seen that the force of the spring will be received by the pins 28 and 29 and will act transversely to the axis of the pins so that there is no danger of dislodging the pins as might be the case if the force were received by staples driven into the support from above. When the trap has been set the safety catch is drawn to its retracted position shown in broken lines in Fig. 2, in which position the catch moves downwardly so that the shoulder 31″ engages the cross pin 28, thus retaining the safety catch out of the path of the bar 35, leaving the trap free to be sprung in the usual manner. A fingerpiece 38 is preferably provided on the rear of the safety catch, not only to provide a convenient device for grasping the catch but also to act as a reminder that the catch should be withdrawn after the trap is set, the presence of the fingerpiece for this purpose being in itself sufficient to call the attention of the operator to the necessity of withdrawing the safety catch when the trap is set. When the trap is sprung the jar incident to the contact of the fall releases the shoulder 31" from its pin 28 and the spring 33 immediately returns the safety catch to its forward position so that it is ready to cooperate with the fall when the trap is again opened. It has been found in actual construction that only a slight jar is sufficient to release the safety catch so that it will spring forward under the tension of the spring 33. This return of the safety catch occurs even when the force of the blow is deadened by striking the body of large animals. It will be thus apparent that the operation of the safety catch is automatic in its engagement with the fall upon opening of the fall and also in its return to operative position after the trap is sprung. The only attention that the operator need give the safety catch is to withdraw it from operative position after the trap has been set. The spring 33 is a convenience in setting the trap, but is not absolutely essential and in case the spring should become displaced or broken the usefulness of the trap is not seriously impaired. By slightly tipping the trap forwardly the force of gravity will act in place of the spring 33 to move the safety catch into its forward position.

In the form shown in Fig. 3 the parts are similar to those in figures already described, except that a pin 39 is provided extending through the catch 25 in position to engage the edge of the block 20 as shown in Fig. 3, to assist the pin 28 in retaining the safety catch in its retracted position or to act in lieu of the pin 28, if desired. Where the pin 39 is used the slot 30 may be left straight similar to slot 29, or the form of slot shown in the drawing may be used. When the safety catch is raised to disengage the pin 39 the opposite ends of the pin will rest on top of the base 20 at the side of the slot 26 so as to assist in preventing any lateral tipping of the safety catch. In ordinary practice, however, the sides of the slot 26 are sufficient to retain the safety catch in its upright position.

In the form of the invention shown in Fig. 5 the shoulder for engaging the pin 28 is arranged at the lower edge of the groove 30 instead of at its upper edge. Where this form of slot is used the safety catch 25 is lifted to retain it in its retracted position. The upper face of the catch 25 may be extended as shown at 40 in position to strike the bar 35 when the trap is opened. This will automatically dislodge the safety catch 25 from the pin 28 in case the safety catch should be in its retracted position when the trap is being set.

In the form of the invention shown in Fig. 6 a trip lever 41 is pivoted at 42 on the catch 25 and is provided with a rearwardly and downwardly extending hook 43, which engages the rear edge of the base 20 to retain the safety catch in retracted position. When the fall is opened the bar 35 strikes the forward end of the lever 41 and automatically releases the hook 43 so that the catch springs forwardly over the bar 35.

In the form shown in Fig. 7, a trip lever 44 is provided similar to the lever in Fig. 6, except that the lever 44 is provided with a shoulder 45 to engage a staple 46 and retain the safety catch in retracted position. The cross bar 35 will automatically release the trip lever 44 from the staple 46 when the jaw is opened.

In the form shown in Fig. 8, the safety catch 25 may be permitted to remain in its forward position at all times if desired. In this form the hook 47 is provided with a pin and slot pivot 48, which will permit the hook 47 to swing downwardly and permit the bar 35 to pass when the jaw is opened. A pin 49 will prevent rotation of the hook 47 in the opposite direction so that the hook will prevent reverse movement of the bar 35. After the trap has been set the hook 47 may be swung in anti-clockwise direction as viewed in Fig. 8 out of the path of the bar 35 without retracting the safety catch. When thus swung, the notch 50 may be dropped into engagement with the pin 49 so as to retain the hook in its inoperative position. If more convenient, the catch 25 may be retracted into the position shown in Fig. 8 instead of swinging the hook 47 out of operative position. It will be apparent that with this form of pivoted hook a stationary upright may be provided in place of the sliding support for the safety catch.

In the form shown in Fig. 9, a trip lever 52 is pivoted at 53 on the safety catch and is provided with a shoulder 54 for engaging the cross bar 35 to retain the safety catch in its retracted position. After the trap has been set it is only necessary to retract the catch against the action of its spring and the counterweight 55 will automatically bring the shoulder into engagement with the cross bar 35, a finger 56 being provided to arrest the upward movement of the forward end of the trip lever. It will be apparent that as soon as the bar 35 is released when the trap is sprung the safety catch 25 will be free to move forwardly into position to engage the cross bar 35 when the trap is opened.

In the form shown in Figs. 11 and 12, a leaf spring 57 is secured to the lug 31 and is provided with a shoulder 58 for engaging the cross bar 35. This spring operates in the same manner as the trip lever 52, shown in Fig. 9.

In the form shown in Figs. 13 and 14, the catch 25 is free to swing about a pivot 59 which engages a slot 60. A pin 61 passes through an enlarged opening 62 in the forward end of the catch. When the pin 59 is in the forward end of the slot 60 the catch automatically tilts backwardly into the position shown in Fig. 13, but when the pin is in the rear end of the slot 60, the catch automatically tilts forwardly as shown in Fig. 14. After the trap has been set the catch 25 is drawn rearwardly so that it will take the position shown in Fig. 13. When the trap is re-set the cross bar 35 will strike the forward end of the safety catch and automatically move it down and slide it forward into the position shown in Fig. 14.

The form shown in Figs. 15 and 16 is similar to that shown in Figs. 1 and 2 except that slotted pins 63 and 64 engage the catch 25 instead of a slot in the base. This form of support for the safety catch is especially applicable to traps having metal bases.

In the form shown in Fig. 17, a pivoted detent 66 is provided with a lug 67 for engaging a notch 68 to retain the catch in its retracted position. A spring 69 automatically moves the detent 67 into engagement with the notch 68 upon withdrawal of the safety catch. When the trap is sprung the jar dislodges the notch 68 from its detent and permits the catch to spring forwardly.

In the form shown in Fig. 18, a detent 78 is provided with a hook 79 for engaging the rear edge of the base 20 to hold the catch 25 in retracted position. The detent 78 may be provided with an upwardly projecting lug 80, having a slot 81 therein arranged to engage a pin 82 secured to the safety hook 25 to guide the detent in its pivotal movement. The operation is similar to that of the device shown in Fig. 17.

In the device shown in Fig. 19, there is no spring provided to automatically draw the safety catch 25 forwardly so that it will remain in any position to which it is moved. A cam lug 83 is provided on the upper edge of the safety catch in position to be struck by the cross bar 35 when the trap is opened to slide the catch forwardly into operative position. After the trap is set the safety catch is retracted and remains in retracted position without any locking device since there is no spring to draw it forward.

In many of the forms shown special means is provided for automatically returning the safety catch to operative position when the trap is opened. In all of these forms, however, where the spring is used for urging the safety catch forwardly the jar of the trap when sprung will release the detent for retaining the safety catch in its operative position so that the spring will automatically re-position the safety catch after the trap has closed. The additional means for releasing the safety catch is an added precaution to provide automatic operation in case the safety catch is withdrawn prior to the opening of the jaw.

As shown in Fig. 20, the spring 33 has a loop 33′ adjacent the staple 34 which holds the end of the spring from being drawn through the staple and which lies flat on the base member 20 and prevents rotation of the spring wire. The opposite end of the spring where it projects from the lug 31 is bent forwardly so that the pressure upon the opening in the lug exerts a camming action on the spring tending to draw the loop 33′ into the staple. The spring is thus automatically held in place even though the staple 34 be loose enough that it would permit the spring to slide endwise. This arrangement makes it possible to remove and replace the spring 33 without loosening the staple 34.

Having thus described my invention, what I claim as new and desire to secure by Letters Patent of the United States, is:

1. A trap having a jaw, a safety catch slidably movable into and out of position in the path of said jaw to prevent closing of said jaw, means for retaining said catch out of said position, and a finger piece on said catch to be engaged by the operator for withdrawing said catch from said position.

2. A trap comprising a base, a jaw mounted on said base, a safety catch movable into and out of position to engage said jaw when said jaw is open comprising an angular plate having the plane thereof arranged at substantially right angles to said base, and means on said base for guiding said safety catch to slide in the direction of the plane of said safety catch.

3. A trap comprising a base, a jaw mounted on said base, a spring for actuating said jaw, a safety catch arranged to hold said jaw in open position against the force of said spring, said catch comprising an angular plate having slots therein, and means extending through said slots transversely to the plane of said plate for guiding said safety catch on said base.

4. A trap comprising a base, a jaw mounted on said base, a safety catch for said jaw comprising an angular plate, having slots extending through one arm thereof and having a detent carried by the other arm thereof for engaging said jaw when said jaw is open, and means on said base extending through said slots transversely to the plane of said plate to guide said safety catch on said base.

5. A trap comprising a horizontal base, a jaw mounted on said base, a safety catch for said jaw comprising a plate having the plane thereof arranged in upright position, means for guiding said plate for sliding movement on said base in the direction of the plane of said plate, and a spring for yieldingly holding said plate in position to engage said jaw when said jaw is open.

6. A trap comprising a base, a jaw mounted on said base, a safety catch comprising a plate having slots extending therethrough, means on said base extending through said slots for guiding said plate to slide on said base, a detent on said plate for engaging said jaw, and means for retaining said detent out of the path of said jaw, said means being releasable when said jaw is sprung.

7. A trap comprising a base having a slot therein, and a safety catch slidably mounted in said slot.

8. A trap comprising a base, a jaw mounted on said base, said base having a slot therein, a safety catch arranged to hold said jaw in open position and comprising a plate slidably mounted in said slot and having openings therethrough, and pins extending through said openings to retain said catch in position in said slot.

9. A trap comprising a base, a jaw mounted on said base, a safety catch for said jaw comprising a plate having angular arms arranged in the plane of said plate, said plate being slidable on said base in the direction of the plane of said plate into and out of the path of said jaw, and means for retaining said catch out of the path of said jaw, said means being releasable when said trap is sprung.

10. A trap comprising a base, a jaw mounted on said base and having a bar extending in the direction of the plane of said base, a safety catch comprising a plate having the plane thereof arranged transversely to the plane of said base, said catch being mounted to slide on said base in the direction of the plane of said plate and having a detent for engaging said bar, a spring for moving said detent into the path of said bar, and means for holding said detent out of the path of said bar, said holding means being releasable when said trap is sprung.

11. A trap comprising a slotted member, a safety catch comprising a plate slidable in said slotted member and having a slot therethrough, and a pin arranged transversely of said plate and extending through the slot therein and having the ends thereof projecting at each side of said plate and seated in said slotted member.

12. A trap comprising a fall, a safety catch for said fall comprising a plate having a hook thereon in the plane of said plate and having a guide slot therethrough, and a pin extending through said slot, said slot having an offset to provide a shoulder to engage said pin and hold said catch out of operative position.

13. A trap comprising a fall member, a safety catch for said fall member having a shouldered slot therein, and means releasable by the jar produced by said fall when sprung for retaining said catch in inoperative position, said means comprising a pin extending transversely of said catch through said slot and adapted to engage the shoulder in said slot.

14. A trap comprising a fall, a safety catch therefor and a spring for actuating said catch, said spring having offset portions thereon for releasably retaining said spring in place.

15. A trap comprising a fall, a safety catch and an actuating spring for said catch, said spring having offset portions at opposite ends thereof, means on said trap for engaging the offset portion at one end of said spring to limit longitudinal movement of said spring in one direction, and means on said safety catch for engaging the offset portion at the opposite end of said spring for resisting longitudinal movement in the opposite direction.

16. A trap comprising a base member, a safety catch slidable on said base member, a bar spring for actuating said catch, and means for removably securing said spring to said base member, said spring having a bent portion at one end for engaging said base to prevent rotation of the spring and to limit longitudinal movement thereof in one direction and having an angular portion at the opposite end for engaging said catch.

In testimony whereof I have signed my name to this specification on this 26th day of March, A. D. 1924.

EMIEL P. SEGHERS.